INVENTOR.
Herman H. Hillmer
BY Henry P. Orent
Arthur H. Sturges
Attorney

United States Patent Office 2,702,431
Patented Feb. 22, 1955

2,702,431

SPACING BLOCK SETTING MECHANISM FOR PHOTOPRINTING APPARATUS

Herman H. Hillmer and Henry P. Orent, Omaha, Nebr., assignors to Printing Engineers Incorporated, Omaha, Nebr., a corporation of Nebraska Application October 23, 1950, Serial No. 191,668

1 Claim. (Cl. 33—125)

This invention relates to machine tools, particularly of the type referred to as bench lathes, and in particular a lathe bed from which conventional lathe parts are omitted and spacing block carrying rod holding standards, a dividing head and an indexing disc are mounted on the lathe bed, whereby spacing blocks of photo printing machines of the step-and-repeat type may be accurately and readily set on the said rods.

The purpose of this invention is to provide means for mounting indexing elements, a dividing head, and tool setting instrumentalities on a conventional lathe so that the parts may be used for accurately positioning spacing blocks of photo printing apparatus and machines on rods on which the blocks are carried in use.

This machine is used, primarily, for setting spacing blocks for use on the photo printing apparatus of our prior Patent No. 2,614,469.

In setting the blocks of the machine of the said copending application it was found necessary to use accurately machined spacing blocks from two to six inches in length in combination with shims, and even with shims of $\frac{1}{1,000}$ of an inch in thickness it has been found difficult to accurately set a stick or row of blocks with the detent or spacing blocks spaced equidistantly.

With this thought in mind this invention contemplates eliminating the spacing blocks and shims heretofore used for positioning or setting the spacing or detent blocks, and accurately positioning the said blocks, which are provided with V-shaped grooves, by accurately setting a V-shaped gage and extending the said V-shaped gage into the groove of a spacing block whereby the block is accurately positioned on a rod on which it is carried.

The spacing blocks are used on what is generally known as "step-and-repeat" machines. These machines comprise two oppositely disposed holders for receiving printed material, one of said holders being movable in relation to the other whereby a single image from material on one of the holders can be reproduced in a plurality of positions on the material of the other holder by successive exposure steps. The success of the reproduction is dependent upon the accuracy of the positioning means of the holders.

Another machine of this type is described in another of our prior Patent No. 2,588,385.

Particular difficulty has been experienced in two color printing with machines of the prior art because extreme accuracy of operation is required to register an image of one color within an image of another color without objectionable overlapping. Overlapping is similarly undesirable in photo printing machines and apparatus although it is not as noticeable in printing in one color.

Machines of the prior art have also employed micrometer screws and the like in an attempt to facilitate the proper positioning of the holders. Considerable waste has resulted from their use because the factor of human error is involved.

The object of this invention is, therefore, to provide mechanical means for accurately positioning spacing blocks for color and photo printing machines whereby the positioning elements are adjusted by screw threads, making it possible to position the elements within $\frac{1}{5,000}$ of an inch.

Another object of the invention is to provide means for mounting spacing block holding rods and dividing and indexing heads on a machine tool whereby the accurate setting elements of the machine tool may be used to position the spacing blocks on rods on which they are carried.

Another object of the invention is to provide a gage element on a carriage of a machine tool whereby the gage element is positioned to extend into a slot of a spacing block to accurately position the said spacing block.

A further object of the invention is to provide a machine tool for use in conjunction with a machine for reproducing an image in a plurality of positions in which spacing blocks are used on carrying rods to position holders of reproducing elements whereby the said spacing blocks may be accurately and precisely spaced on their respective carrier rods and removed from the spacing machine and positioned in the reproducing machine without altering the spacing thereof.

A further object of the invention is to provide means for converting a machine tool, such as a lathe, into an accurately spacing device whereby the fundamental elements of the machine tool remain intact.

And a still further object of the invention is to provide attachments for a machine tool such as a lathe, whereby the tool may be used for accurately positioning spacing blocks in which the parts are of comparatively simple and economical construction.

With these and other objects and advantages in view the invention embodies the bed and supporting legs of a machine tool with a conventional carriage and feed screw in position upon the bed, with vertically disposed standards rigidly mounted on the bed and positioned to provide mounting means for rods upon which spacing blocks are positioned, and an indexing disc having a plurality of rows of spaced openings therein with a pin carried by an arm and positioned to coact with the said openings and with a shaft on which the arm is mounted connected through helical gears to the feed screw of the machine whereby with the pin actuated from one opening to another the carriage is caused to travel on the bed of the machine by the said feed screw.

The invention also includes a graduated disc upon which parts may be set for accurately positioning a carriage on the feed screw and a V-shaped gage mounted on a platform of the carriage for registry with slots in the spacing blocks on the carrier rods.

Other features and advantages of the invention will appear from the following description taken in connection with the drawing, wherein.

Figure 1:
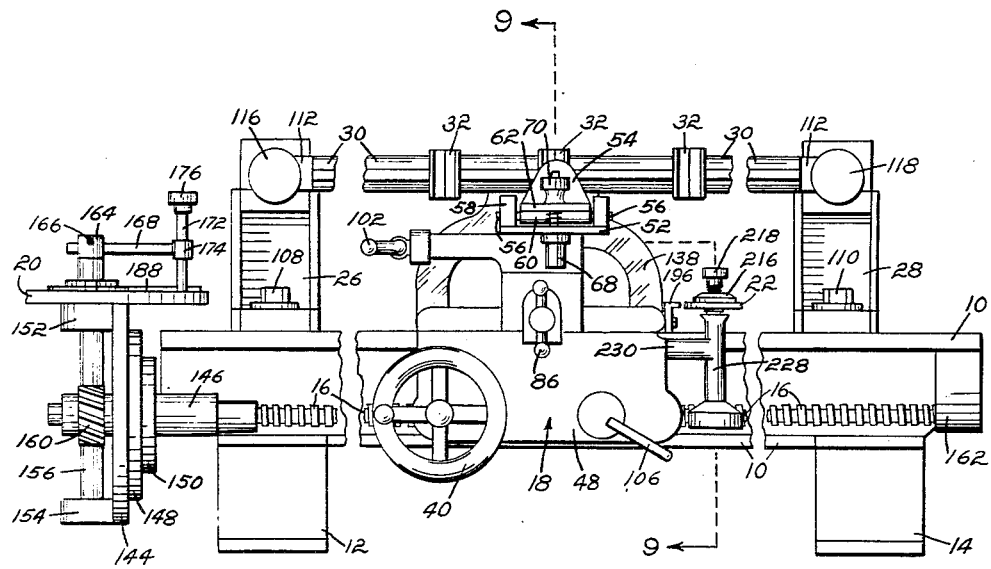
Figure 1 is a front elevational view of the converted machine tool with parts broken away and showing the spacing blocks carried by a rod mounted on standards positioned on the bed of the tool.

Referring now to the drawings wherein like reference characters denote corresponding parts the spacing block setting machine of this invention includes a lathe bed 10 having legs 12 and 14, a feed screw 16, a carriage 18, an indexing disc 20, a graduated disc 22, a gage 24, standards 26 and 28 in which carrier rods 30 are mounted, and spacing blocks 32 which are positioned on the carrier rods.

The carriage 18, which is longitudinally slidable on the machine bed 10, by means of a dovetail groove 34 that receives a tongue 36 on a mounting plate 38, is actuated by a hand wheel 40 which moves the carriage longitudinally on the machine bed, such as the handle 8' and rack and pinion of the lathe in Patent No. 655,986. The graduated disc 22 is provided to indicate distances of travel of the carriage relative to the threads of the feed screw while disconnected therefrom, the disc being adapted to be set to a dimension, such as one and seven-eighths of an inch, the distance between the spacing blocks; and the carriage when connected to the feed screw traveling $\frac{1}{8}$ of an inch with each revolution of the screw, the screw being $\frac{1}{8}$ of an inch pitch; and the threads of the screw are positioned by the arm of the indexing disc 20 whereby the threads of the machine screw may be turned to adjust the carriage $\frac{1}{64}$ of an inch by means of an outer row of openings 42 of the indexing disc 20, $\frac{1}{96}$ of an inch by means of an intermediate row of openings 44, or $\frac{1}{5000}$ of an inch by means of an inner row of openings 46.

The graduated disc 22 at the opposite end of the carriage is provided to facilitate setting the carriage whereby the carriage may be accurately set to positions between the spacing blocks, and with the distance between the blocks accurately determined the feed screw may be actuated to move the carriage accurately to a predetermined distance which is determined by the photo printing machine upon which the spacing blocks are used.

Figure 9:
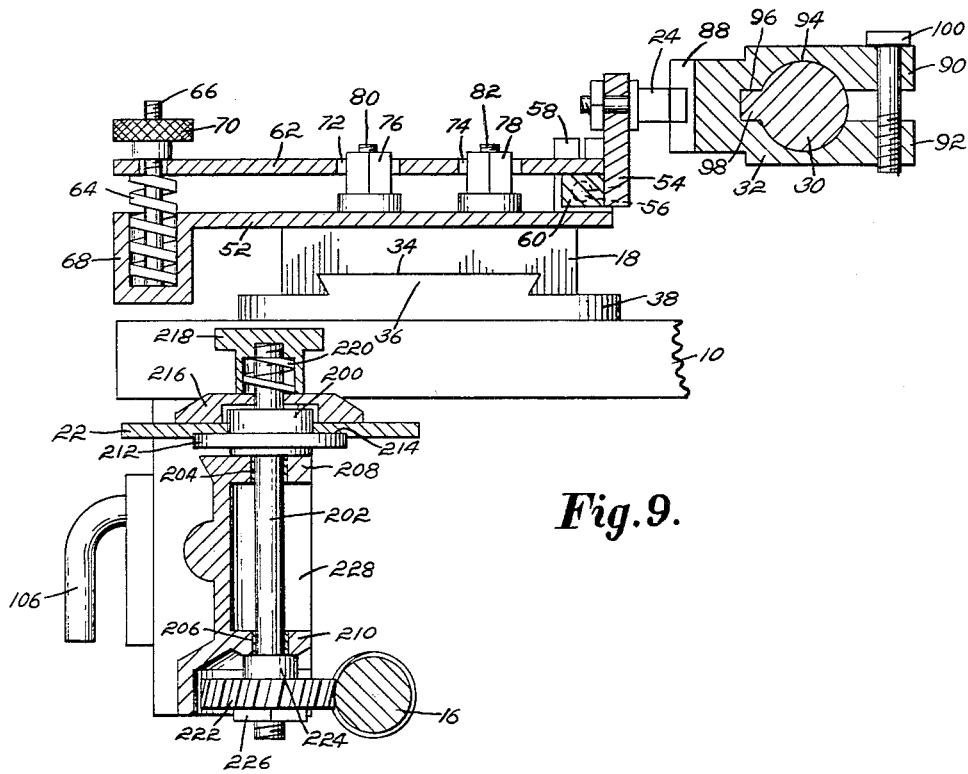
Figure 9 is a detail showing a cross section through the machine tool taken substantially on line 9—9 of Figure 1 and showing, in particular, the spacing block positioning gage, the carriage mounting and the graduated disc for accurately indicating adjusted positions of the carriage on the feed screw of the machine.

The lathe or machine bed 10, the carriage 18 and the supporting legs 12 and 14 are conventional and the carriage which is provided with a front plate 48 and a back plate 50 is provided with an upper platform 52 on which the gage 24 is mounted, as illustrated in Figure 9. The gage is supported in a plate 54 that is pivotally mounted by pins 56 on the plate 52 with the pins extended into lugs 58 on the plate 52 and carried by a block 60 on the inner surface of the plate 54. An upper plate 62 is also mounted on the block 60 and this plate is resiliently held upwardly by a spring 64 on a stud 66 extended upwardly from a socket 68 in the end of the plate 52. The plate 62 is held downwardly against the spring 64 by a nut 70 and the intermediate part of the plate 62 is provided with openings 72 and 74 that are positioned to receive nuts 76 and 78 on studs 80 and 82 which secure the plate 52 on the carriage 18.

The carriage is also provided with a transversely disposed screw 84 that is actuated by a lever 86 whereby the upper part of the carriage is moved transversely so that the gage 24 may be inserted in or withdrawn from a V-shaped notch 88 of one of the spacing blocks 32.

The spacing blocks are provided with extended sections 90 and 92 with a substantially circular opening 94 through which the rods 30 extend and the blocks are also provided with keyways 96 which are positioned to receive keys 98 on the rods. The extended sections 90 and 92 are drawn together by bolts 100 for clamping the spacing blocks in position upon the rods.

The carriage is also provided with a crank arm 102, such as the handle 20 of the cross feed of the saddle 11 of Patent No. 2,525,677, the cross feed being similar to the screw 20 and handle 21 of Patent No. 2,004,388 by which an upper section upon which the plate 52 is carried may be adjusted longitudinally to $\frac{1}{1000}$ of an inch.

The carriage is also provided with a hand lever 106 by which the carriage is drivably connected to the feed screw 16 by a suitable clutch mechanism as described in lines 16 to 38 of page 8 of Patent No. 1,082,652, or as noted in Patent No. 367,246, or by other suitable means after the carriage is adjusted to a desired position on the bed of the machine.

Figure 2:
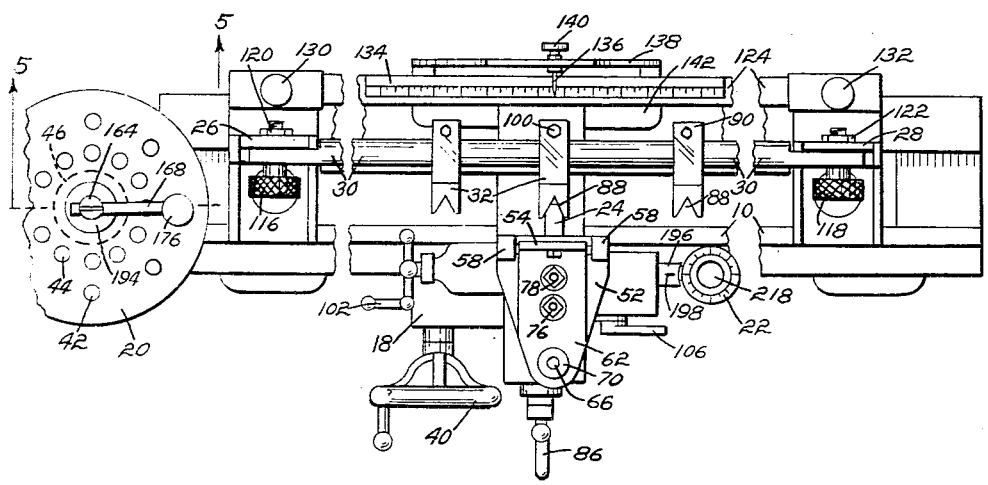
Figure 2 is a plan view of the machine tool as illustrated in Figure 1, also with parts broken away.
Figure 3:
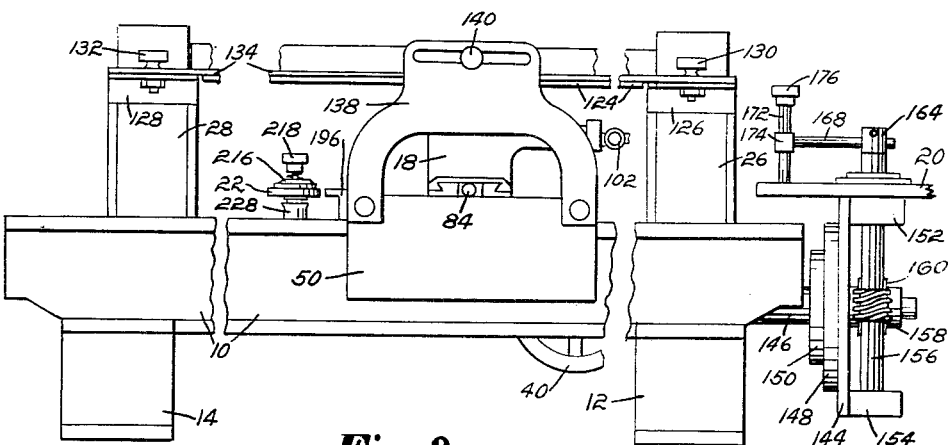
Figure 3 is a rear elevational view showing the machine as illustrated in Figure 1 and also with parts broken away.
Figure 4:
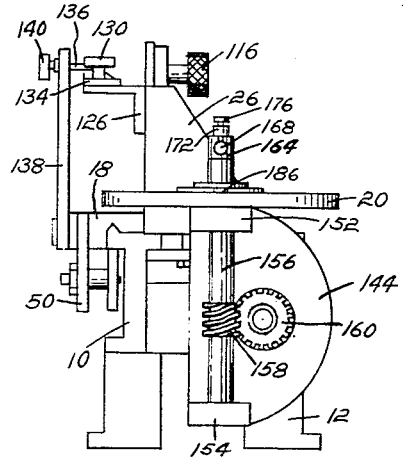
Figure 4 is an end elevational view looking toward the end of the machine tool on which the indexing disc is positioned.
Figure 5:
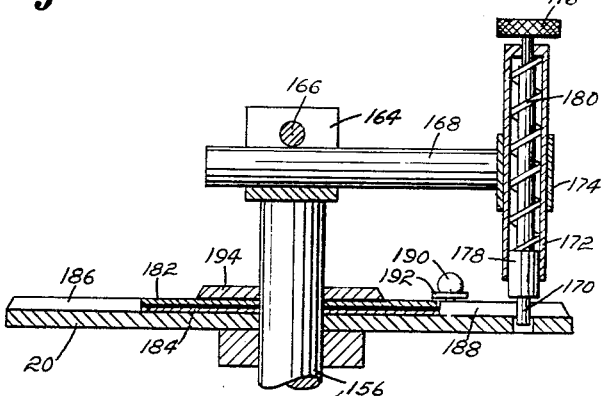
Figure 5 is a detail showing a vertical section through the indexing disc, pin carrying arm and mounting shaft thereof, taken on line 5—5 of Figure 2.
Figure 6:
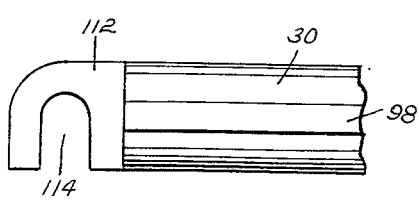
Figure 6 is a detail illustrating an end of one of the spacing block carrying rods showing the slotted mounting clips on the ends of the rods.

The standards 26 and 28 are secured to the machine bed by bolts 108 and 110, respectively, and the rods 30, the ends of which are provided with clips 112 with notches 114 in the under surfaces, are secured on the standards by thumb screws 116 and 118, the thumb screws being provided with lock nuts 120 and 122, respectively, as shown in Figure 2.

The standards are also provided with a back rail 124 that is secured to angles 126 and 128 on the upper ends thereof by thumb screws 130 and 132. The rail 124 is provided with a scale 134 which coacts with a pointer 136 which is secured in a flange 138 on the rear portion of the carriage by a thumb screw 140. The flange 138 extends upwardly from a plate 142. The pointer 136 is used to set the carriage to a predetermined position in relation to the stationary scale 134 on the standards of the bed of the machine.

The carriage is accurately adjusted through the feed screw 16 by setting the exact position on the indexing disc 20 and the disc is mounted on a bracket 144 at the end of the bed of the machine. The bracket is secured to a bearing 146 in which one end of the feed screw 16 is journaled through discs 148 and 150 and the bracket 144 is provided with bearings 152 and 154 in which a vertically positioned spindle 156 is journaled. The spindle is provided with a helical gear 158 that meshes with a similar helical gear 160 on the feed screw 16 whereby rotation of the spindle 156 rotates the feed screw. The opposite end of the feed screw is journaled in a bearing 162 on the opposite end of the machine bed.

The spindle 156 extends through the disc 20 and the upper end is provided with a socket 164, the sides of which are clamped together by a screw 166, whereby a horizontally disposed shaft 168, that carries a pin 170, may be clamped.

The pin 170 is slidably mounted in a vertically positioned sleeve 172 that is secured in a head 174 on the end of the shaft 168 and the pin is provided with a knurled nut 176 that extends above the upper end of the sleeve 172 by which the pin may be withdrawn from the openings in the disc 20. The pin 170 is also provided with a collar 178 that is slidably mounted in the sleeve 172 and resiliently urged downwardly by a spring 180.

With the parts mounted in this manner the pin 170 may be withdrawn and the shaft 168 turned to rotate the spindle 156 and, through the gears 158 and 160, rotate the feed screw 16. The pin 170 may be moved from one of the openings 42 to another or by adjusting the shaft 168 inwardly toward the center the pin may be inserted in one of the openings 44, and by adjusting the shaft further inwardly the pin may be inserted in one of the openings 46 whereby the position of the carriage may be moved $\frac{1}{5000}$ of an inch.

The indexing disc 20 is also provided with circular plates 182 and 184 having radially extended arms with the plate 182 provided with an arm 186 and the plate 184 with an arm 188. The arm 188 is provided with a thumb screw 190, a flange 192 of which extends over the edge of the plate 182 whereby the plates with the arms extended therefrom may be clamped together when the positions of the plates in relation to each other are set. The inner portions of the circular plates may be covered with a finishing disc 194, as desired.

The arms 186 and 188 are provided for rapidly repeated adjustments where a plurality of the spacing block carrying rods 30 are required with the blocks thereon spaced the same distance.

The graduated disc 22, at the opposite end of the carriage, is positioned to coact with a clip 196 having a point 198 thereon and the disc is freely mounted on a hub 200 of a shaft 202 which is journaled in bearings 204 and 206 in flanges 208 and 210 of the front plate 48 of the carriage. The hub 200 is provided with a flange 212 that nests in a recess 214 of the disc 22 and the disc is clamped against the flange by an inverted cup-shape washer 216 which is clamped by a nut 218 threaded on the upper end of the shaft and resiliently held upwardly by a spring 220. A worm gear 222 which is secured against a collar 224 on the lower end of the shaft by a nut 226, meshes with the feed screw 16. It will be noted that by loosening the nut 218 the graduated disc 22 will be released from the flange whereby the feed screw 16 may rotate without turning the disc 22. The disc 22 is provided with graduations corresponding to inches and fractions thereof whereby the disc may be set to the desired spacing of the spacing blocks on the rod 30 so that by rotating the hand wheel and observing the rotation of the disc the parts may be set whereby the carriage may be moved a distance, such as one and seven-eighths of an inch to correspond with the distance between the spacing blocks.

The housing 228 in which the shaft 202 is positioned may be connected to the carriage by an arm 230 as shown in Figure 1.

By this means spacing blocks may be accurately positioned on the rods 30 with the blocks set to positions within 1/5,000 of an inch.

Figure 7:
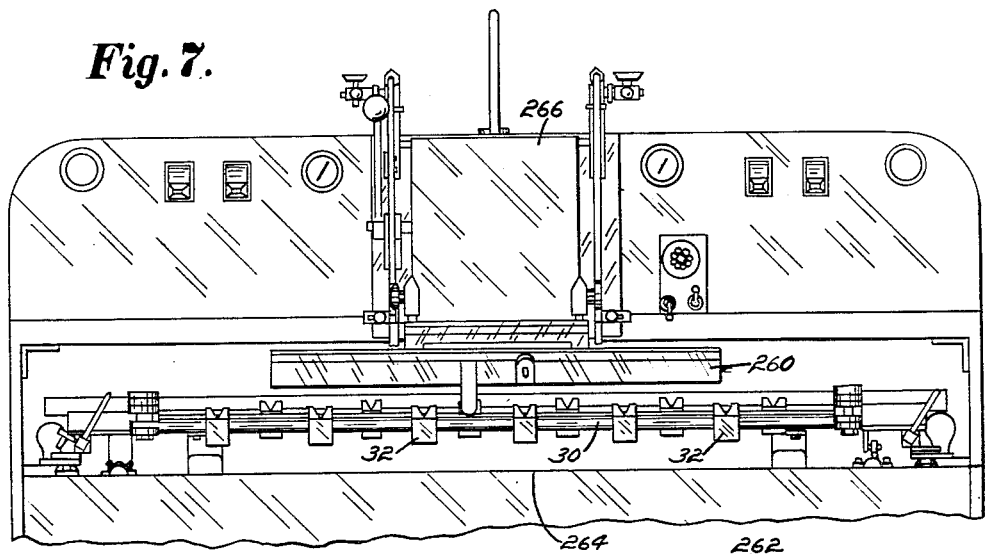
Figure 7 is a front elevational view illustrating the use of the spacing blocks with the rods on which the blocks are carried in a photo printing machine.
Figure 8:
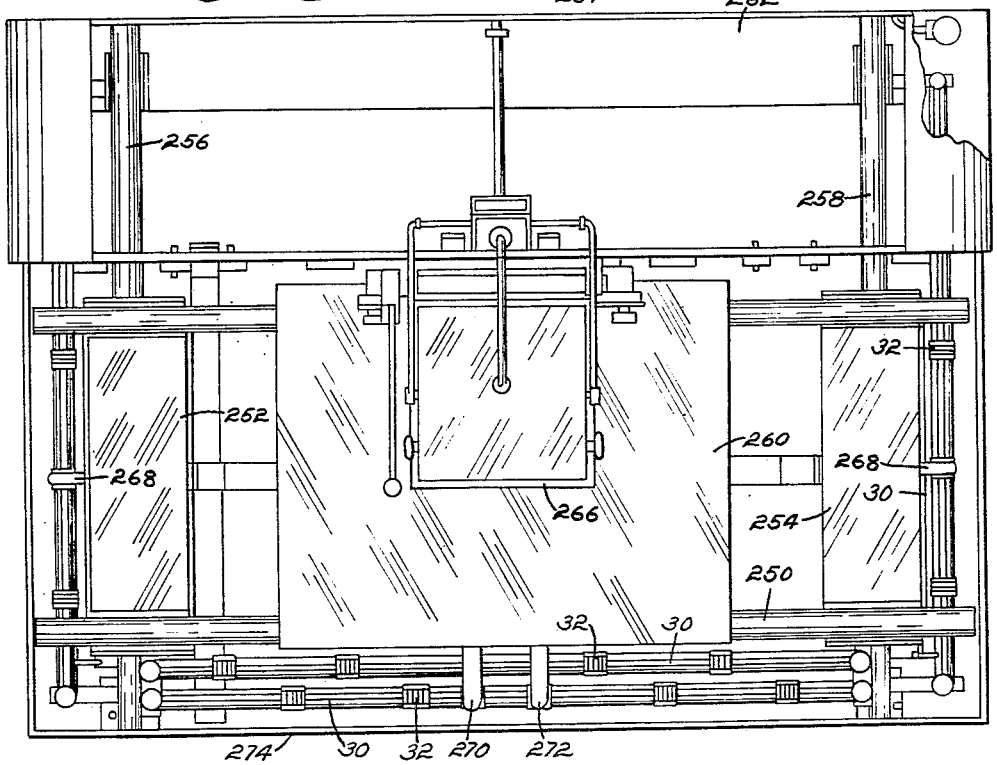
Figure 8 is a plan view of the machine as shown in Figure 7 also illustrating the positions of the spacing blocks on photo printing apparatus.

In the photo printing machine illustrated in Figures 7 and 8 the spacing blocks 32 are shown on rods 30 which are positioned so that the spacing blocks stop and locate holders accurately for reproducing slides and the like and by this means an operator may be assured that the holders will be accurately positioned.

In this machine longitudinally disposed tracks 250 support a platform 260 which is mounted to travel on the said tracks and the tracks are mounted on carriage plates 252 and 254 which are mounted to travel on transversely disposed rails 256 and 258 of a mounting frame 262 which is provided with a bed 264.

The machine is provided with a lamp housing 266 that is carried by the mounting frame and positioned above the platform 260.

The detents or spacing blocks 32 are positioned on rods 30 which, as shown in Figure 8, are provided at both ends of the machine whereby arms 268 which carry detents that coact with the spacing blocks extend over the rods as shown in Patent No. 2,588,385. It will also be noted that a pair of rods are provided at the front of the machine and the spacing blocks 32 on these rods are positioned to coact with arms 270 and 272 on the front or side of the platform.

The spacing blocks 32 and rods 30 are set up on the machine of this invention and after the spacing blocks are accurately positioned on the rods the rods are removed and positioned in the mounting frame, as indicated by the numeral 274 and as illustrated in Figures 7 and 8.

In the operation of this machine spacing blocks 32 are positioned on rods 30, secured in operative position in the standards 26 and 28. The carriage 18 is actuated by the hand wheel 40 to a desired position as determined by the scale 134 and the pointer 136, and the carriage is then put into driven relation with the feed screw by operating the lever 106. The gage 24 mounted on the carriage is then ready to be accurately positioned by the indexing disc 20, and the crank arm 168 is rotated in either a clockwise or counter-clockwise direction whereby a corresponding movement is transmitted to the carriage through the shaft 156 and feed screw 16.

With the parts accurately machined the carriage is moved 1/64 of an inch when the shaft 168 is moved from one of the openings 42 to another, 1/96 of an inch when the shaft is moved from one of the openings 44 to another, and 1/5,000 of an inch when the shaft is moved from one of the openings 46 to another. As the pin 170 carried by the end of the shaft 168 is dropped into one of the openings the shaft 168 locks the movement of the feed screw and, so long as the clutch is engaged, of the carriage.

In order to space the blocks 32 for step-and-repeat operations of a photo printing machine it is often desired to repeat the movement of the carriage for setting spacing blocks on the same or on different rods and for this purpose the radially disposed arms 186 and 188 are provided.

Figure 10:
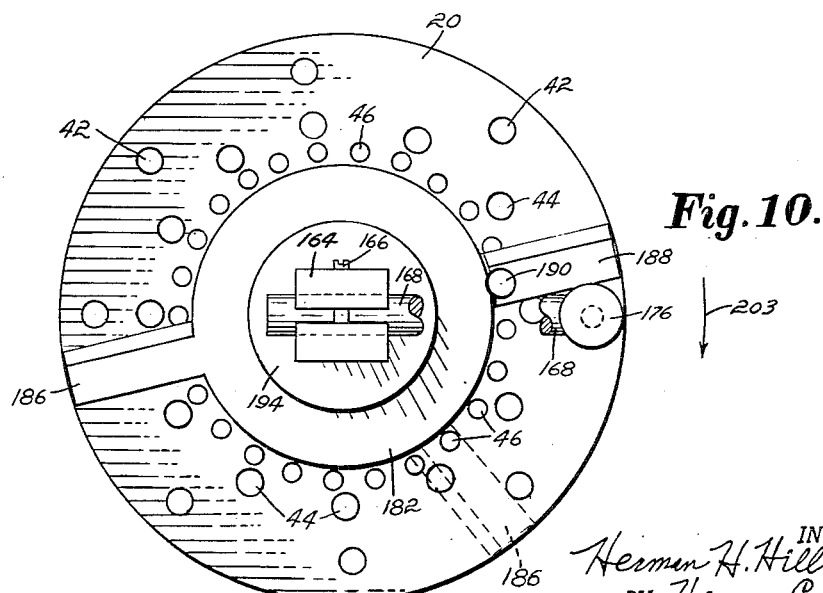
Figure 10 is a plan view of the indexing disc with part of the pin carrying arm broken away.

In this operation, as an illustration, the pin 170 is placed in one of the openings 42, as illustrated in Figure 10, and the arm 188 is moved against one side of the pin. With the holding screw 190 loose the arm 186 is moved around to the position shown in dotted lines where it would engage the opposite side of the pin in the next position of the latter and with the arms in this position the screw 190 is tightened so that the arms are locked together. When the arms are locked in this position the pin 170 is withdrawn and placed in the opening where it is stopped by engagement with the arm 188. By this means repeated operations may be performed without calculation on the part of the operator.

By the same means the machine may be moved with the arms 186 and 188 set to correspond with the openings 44 and 46.

Furthermore, assuming that it is desired to place a selected number of spacing blocks on a rod equidistantly so that the distances between the blocks, such as the longitudinal axes of the blocks, are precisely two and one-five-thousandth of an inch the procedure is as follows:

The operator positions the carriage 18 with respect to the scale 134 which is the same thing as to say the operator places the longitudinal axis of the carriage 18, namely the axis which is transversely disposed with respect to the bed 10, at an initial selected position with respect to the scale 134, through the pointer 136. In the initial setting of the carriage with respect to the scale 134 the hand wheel 40 is used for moving the carriage in a preselected arbitrary position, namely a position which is within or approximately within 1/16 of an inch of the desired position.

The carriage 18 is then connected in this position with the feed screw 16 by the lever 106 whereby the carriage is held by the clutch members to the thread of the feed screw so that when the feed screw is rotated a corresponding movement is imparted to the carriage. When the carriage is connected with the screw by the lever 106 and clutch members the hand wheel 40 is in free or released position. In starting the operation of setting the spacing blocks 32 the carriage is actuated whereby the pointer 136 registers with a predetermined mark on the scale 134 and the distance of the gage 24 from the pointer, such as one and seven-eighths of an inch, determines the position of the first spacing block.

At this time a selected movement of a spacing block 32 which is then loosely positioned on the rod 30 is accomplished by the fingers of the operator so that the block is brought into position to be engaged by the gage 24. The operator may then move the gage transversely into position with the spacing block by the crank 86 so that the wedge-shaped gage will enter the V-shaped groove of the spacing block and with the position of the gage accurately indicated by the indexing disc 20 the sloping surfaces will engage whereby the spacing block will slide on the rod until it is in exact registry with the gage 24. The bolt 100 is then actuated to clamp the spacing block in position upon the rod.

The micrometer scale, namely the finely divided annular scale on the disc 22, is then consulted. The said disc 22 is then loosened with respect to its driver shaft 202, the latter being driven by the feed screw 16, said loosening being consummated by manipulation of the nut 218 so that the spring 220 does not cause the disc 22 to be gripped between the disc or washer 212 and the hold-down washer 216. As soon as the disc 22 is loosened sufficiently the disc is rotated so that the number 1 mark of the annular scale of the disc and the hair mark of the scale designated by the said numeral are disposed in alignment with the hair mark or indicator 198 carried by the stationary arm 196, this part of the operation being known as setting the scale disc 22 at "zero."

At this time the crank arm 168, employed cooperatively with respect to the other or apertured disc 20, is set so that the pin 170 thereof engages in any one of the twenty-five apertures of the inner annular row 46 of apertures and before proceeding further.

The disc 22 is then caused to be locked to the shaft 202 by a manipulation of the nut 218 for causing the urge of the spring 220 to be applied for the said purpose.

It will be understood that the scale on the disc 22 is shown in Figure 2 and that the said scale is divided into equidistantly spaced apart hair marks and, for convenience of illustration, the numerals carried by the disc 22 for designating parts of the said scale are omitted from the drawings.

Referring to Figure 2, it will be understood that the divisions of the scale of the disc 22 are as follows:

Adjacent the perimeter of the disc 22 the latter is divided into four equidistantly spaced apart marks. Each one of the said four major divisions of the scale represents precisely one inch of movement of the carriage. Each of the said major four divisions is subdivided further into divisions having hair lines so that each one of the said major divisions is divided into eight parts, said eight parts representing one-eighth of an inch of movement of the carriage 18.

As above described the pitch of the thread on the feed screw 16 is eight to an inch. It follows that at the time the lever 106 is manipulated for engaging the carriage 18 with the shaft 16 the clutch, not shown, which is actuated by a movement of the lever 106 engages between two of the convolutions of the thread so that at that time the mark on disc 22 is caused to align with the indicator 198 carried by the arm 196, said disc, carriage and feed screw 16 being in a fixed position with respect to each other whereby the carriage is shifted the amount, less than 1/8", necessary to bring the clutch members into exact engaging position with turns of the thread.

The lever 106 is now released and the crank wheel 40 is then used for moving the carriage 18 to a certain distance, such as, for example, one and seven-eighths of an inch as shown to the operator by the scale on the disc 22. In other words, the operator notes that the disc has made one-fourth revolution and, in addition thereto, has moved a further seven-eighths of an inch; namely a total of fifteen subdivisions of the scale of the disc 22 since each subdivision represents one-eighth of an inch.

At this time the carriage 18 is again connected by the lever 106 to the feed screw 16 and in a position such that it is in a one-eighth division of an inch since the pitch of the thread on the feed screw 16 is in multiples of one-eighth of an inch.

As thus described it will be understood that the carriage has been caused to travel precisely one and seven-eighths inches with respect to the position thereof at the time the initial detent or spacing block 32 was locked to the rod 30 with the exception, of course, that while the machine is precisely built yet nevertheless there is a minute amount of lost motion on account of the play between the interfitting parts.

By this means the carriage has been caused to travel one and seven-eighths inches after the clutch members have been brought into engagement with the feed screw from its initial starting point preparatory to spacing the carriage two and one-five thousandths inches for setting the next block 32.

The operator now further manipulates the machine for causing a compensation or taking up of any lost motion occasioned by the looseness of the fit of the said parts or occasioned by continuous wear and for this purpose the operator employs the hand crank or shaft 168 disposed at the lefthand side of the new machine.

As above described the disc 20 is provided with an inner annular row of apertures 46 the latter being twenty-five in number.

Also as above described the pin 170 carried by the crank arm 168 has been disposed in one of the apertures 46. The said apertures of said inner annular row represent one five-thousandth inch of travel of the carriage whereby the above setting and locking of the parts of the scale disc 20 and a setting and locking associated with the lever 106 are possible since the one five-thousandth is minute compared to the one-eighth inch of setting and locking with respect to the disc 22.

After the carriage has been moved one and seven-eighths inches from its initial starting point the crank arm 168 is then employed to compensate for any looseness of fit resultant from wear or manufacture of the parts and for settings of the carriage which are less than one-eighth inch as follows:

The arm 188 swingably disposed on the disc 20 is now caused to be abutted against the pin 170 and moved from its full line position thereof shown in Figure 10 for the said purpose, said movement being in the direction of the arrow 203. The other arm 186 is now turned or swung from the full line position thereof shown in Figure 10 and in a direction reverse to the arrow 203 so that the then leading edge of the arm 186 is disposed in alignment with the wall of the aperture 46 which is next adjacent, in the direction of the arrow 203, to that certain aperture 46 in which the pin 170 carried by the crank arm 168 is disposed resultant from the initial setting of said pin and prior to manipulation in connection with the scale disc 22.

The arms 188 and 186 are now caused to be locked together by the locking screw 190.

The pin 170 is now caused to become freed from the disc 20 and raised above the arms 188 and 186 whereupon the operator causes the crank arm 168 to define one complete revolution about the axis of the shaft 156 which causes the carriage 18 to be moved one-eighth inch, the ratio of the helical gears 158 and 160 being 1 to 1, and a total of two inches.

The pin 170 is now caused to abut the arm 186 and to be received in that certain aperture 46 against the wall of which the arm 186 is disposed, which adds to the movement of the carriage the desired one-five thousandth inch or a total of two and one-five thousandth inches.

Since the carriage has been now moved the desired extent a further detent block 32 is placed in approximate position by sliding it along the rod 30 whereupon the operator manipulates the crank 86 for causing the spacing gage 24 to engage in the notch 88 of the said further spacing block and in the same manner as described with respect to the initial block locked to the rod 30.

The operator now causes the said further block to become locked to the rod by a manipulation of the locking pin or bolt 100 of the said further spacing block.

The arms 188 and 186, which are locked together at this time by means of the screw 190 are now further swung until the arm 188 again abuts the pin 170 carried by the arm 168 and the said mechanism is again manipulated as above set out for causing a further block 32 to be accurately positioned on the rod 30 and the process is further continued likewise until all of the blocks 32 on the rod 30 are equidistantly spaced apart the said two and one-five thousandth inches and locked to the rod.

Obviously, if the operator desires to subtract a given fraction of an inch or a whole inch from the distance the said blocks 32 are spaced apart, the crank arm 168 may be rotated in an opposite direction for the said purpose and also the carriage 18 may be moved in a direction complemental to said opposite direction for the said purpose.

From the foregoing description it is thought to be obvious that a spacing block setting machine constructed in accordance with this invention is particularly well adapted for use by reason of the convenience and facility with which it may be assembled and operated, and it will also be obvious that the invention is susceptible of some change and modification without departing from the principles and spirit thereof, and for this reason it is not to be understood that the invention is limited to the precise arrangement and formation of the several parts herein shown, except as claimed.

Having thus fully described the invention what we claim is new and desire to secure by Letters Patent, is:

A spacing block setting attachment comprising a machine bed, a carriage positioned on the bed of the machine and longitudinally slidable thereon, a hand wheel for independently actuating the carriage, a feed screw journaled in the bed of the machine for actuating the carriage, means for operatively connecting the carriage to the feed screw, means for actuating said connecting means, an indexing disc carried by the bed of the machine, a vertically positioned spindle journaled on the bed of the machine and extended through the said indexing disc, helical gears for turning the feed screw by the spindle, said indexing disc having a plurality of openings therein, a pin carried by the spindle and positioned to extend into the openings of the disc for adjusting the position of the feed screw and carriage, means positioning rods on the bed of the machine, a gage mounted on the carriage for positioning spacing blocks on the said rods, a pointer carried by the carriage and a stationary scale carried by the rod positioning means and positioned to coact with the pointer for accurately setting the carriage.

References Cited in the file of this patent
UNITED STATES PATENTS

| Number | Name | Date |
|---|---|---|
| 281,283 | Mershon | July 17, 1883 |
| 367,246 | Slayton | July 26, 1887 |
| 498,497 | Wilkie | May 30, 1893 |
| 655,986 | Nuttall | Aug. 14, 1900 |
| 806,996 | Schuerman | Dec. 12, 1905 |
| 992,843 | Berold | May 23, 1911 |
| 1,082,652 | Roth | Dec. 30, 1913 |
| 1,840,990 | Tubbs | Jan. 12, 1932 |
| 1,855,700 | Wieser | Apr. 26, 1932 |
| 1,863,007 | Elkins | June 14, 1932 |
| 2,004,388 | De Wald | June 11, 1935 |
| 2,525,677 | Holliday | Oct. 10, 1950 |
| 2,584,963 | Hoelscher | Feb. 5, 1952 |